US008681073B1

(12) United States Patent
Robbins et al.

(10) Patent No.: US 8,681,073 B1
(45) Date of Patent: Mar. 25, 2014

(54) SYSTEM FOR AND METHOD OF CONTROLLING CONTRAST OR COLOR CONTRAST IN SEE-THROUGH DISPLAYS

(75) Inventors: Steven J. Robbins, West Linn, OR (US); Michael W. Cofer, Dewey, AZ (US); Kenneth A. Zimmerman, Sherwood, OR (US); Michael J. Oldham, Woodburn, OR (US); John G. Wilson, West Linn, OR (US)

(73) Assignee: Rockwell Collins, Inc., Cedar Rapids, IA (US)

(*) Notice: Subject to any disclaimer, the term of this patent is extended or adjusted under 35 U.S.C. 154(b) by 168 days.

(21) Appl. No.: 13/249,012

(22) Filed: Sep. 29, 2011

(51) Int. Cl.
*G06G 5/00* (2006.01)

(52) U.S. Cl.
USPC ............................................................ 345/7

(58) Field of Classification Search
USPC .................................................. 345/7–9, 633
See application file for complete search history.

(56) References Cited

U.S. PATENT DOCUMENTS

| 4,842,389 | A | 6/1989 | Wood et al. |
| 5,001,558 | A | 3/1991 | Burley et al. |
| 6,163,309 | A | 12/2000 | Weinert |
| 7,605,773 | B2 * | 10/2009 | Janssen ............................ 345/7 |
| 8,327,279 | B2 * | 12/2012 | Yamamoto et al. ........... 715/757 |
| 2010/0225566 | A1 * | 9/2010 | Sato .................................. 345/8 |
| 2010/0289632 | A1 * | 11/2010 | Seder et al. .................... 340/436 |

FOREIGN PATENT DOCUMENTS

JP 09101477 A * 4/1997

OTHER PUBLICATIONS

Office Action for U.S. Appl. No. 11/528,920, mail date Jul. 23, 2009, 10 pages.
Office Action for U.S. Appl. No. 11/528,920, mail date Feb. 3, 2010, 10 pages.
U.S. Appl. No. 11/528,920, filed Sep. 28, 2006, Pitchford et al.
Brief on Appeal for U.S. Appl. No. 11/528,920, filed Aug. 2, 2010, 47 pages.
Examiner's Answer for U.S. Appl. No. 11/528,920, mail date Oct. 27, 2010, 17 pages.
Reply Brief for U.S. Appl. No. 11/528,920, filed Dec. 22, 2010, 12 pages.

* cited by examiner

*Primary Examiner* — Joe H Cheng
*Assistant Examiner* — Steven Holton
(74) *Attorney, Agent, or Firm* — Donna P. Suchy; Daniel M. Barbieri (57) ABSTRACT

A method of controlling a see-through display includes receiving a sensor signal. The sensor signal provides a representation of an image associated with a view of an outside scene. The method also includes receiving a video frame having pixels. Each of the pixels has a color and intensity. The method further includes changing the color or the intensity of selected pixels of the pixels in response to the sensor signal on a zonal or pixel basis.

20 Claims, 7 Drawing Sheets

SYSTEM FOR AND METHOD OF CONTROLLING CONTRAST OR COLOR CONTRAST IN SEE-THROUGH DISPLAYS

BACKGROUND OF THE INVENTION

The present disclosure relates generally to the field of contrast and/or color contrast control in displays. More particularly, the present disclosure relates to color contrast control and/or contrast control of a see-through display.

See-through displays are utilized in a wide variety of applications including but not limited to medical, military, avionic, entertainment, sporting, navigation and computing applications. In one exemplary application, see-through displays are used in head-up display (HUD) systems and wearable displays, such as, helmet mounted display (HMD) systems, etc. Other see-through displays include, but are not limited to, augmented reality displays and digital night vision systems.

In aircraft applications, HUD and HMD systems advantageously allow the flight crew to maintain eye contact with the outside environment while simultaneously viewing information from aircraft systems and sensors in a graphical and alphanumeric format overlaying the outside world view on a computer. Head-up display systems are known to provide conformal information such that displayed features overlay the environmental view. The display features can include display information from a camera or other imaging sensor (such as a visible light imaging sensor, infrared imaging sensor, millimeter wave radar imager, etc.) mounted on the aircraft.

The contrast and color contrast of display symbology and images viewed on see-through displays, such as HUDs, HMDs, digital night vision systems and augmented reality displays, can be adversely affected by the ambient illumination as seen through the display. In see-through display systems that include a combiner or combining optics, the ambient illumination is generally provided through the combiner or combining optics. Bright ambient light can adversely affect the contrast associated with an image projected on the combiner. Further, colors can be washed out when the display symbology or display image matches the color of the ambient illumination, thereby making the display symbology or display image difficult to ascertain. For example, a red symbol can be washed out when viewed at sunset, especially a sunset that provides a reddish glow to the atmosphere.

The color balance of images on the see-through display can also be affected by ambient light. Changes to the color balance change the overall mixture of colors associated with the image on the color display. Color balance changes can make the image and symbology appear less visually pleasing, and less accurate, and can obscure display symbology and images.

Generally, see-through display systems utilize manual display brightness control or an automatic brightness control (ABC) algorithm to compensate for varying ambient light conditions. The ABC algorithm generally utilizes a single photo detector directed toward the see-through view and provides brightness adjustment based upon ambient light received at a single point. The photo detector can only represent a point in the general direction of ambient light and does not take into account the detailed content of the see-through view. Accordingly, the ABC algorithm provides a global adjustment to display brightness based upon a very limited view of ambient light conditions.

Digital night vision systems are see-through displays that can also have problems associated with mixed ambient conditions. For example, mixed urban environments may contain areas that are lit by street lights and viewable with the naked eye and other areas such as darkened alleys which are only viewable using the sensors. In conventional digital night vision systems, the sensor enhances the entire scene, even parts of the scene that can already been seen by the naked eye. Enhancement of the entire mixed scene potentially can degrade the user's view of the outside world because the view from the naked eye can be better than the view through the sensor when the outside scene is viewable. (The resolution of the digital night vision system or sensor is typically far less than the user's visual acuity in lighted conditions). Thus, objects that are visible can actually be degraded if viewed through the conventional night vision system.

Accordingly, there is a need for a system for and a method of color contrast and/or contrast control for a see-through display. There is also a need for a contrast control for see-through displays that compensates for the detailed content of the see-through view and provides a more specific adjustment to display contrast or color contrast. Further still, there is a need for a system for and a method of adjusting display contrast in a more sophisticated fashion. Further still, there is a need for a system for and a method of adjusting color contrast in color displays viewed against the outside world. Further still, there is a need for a system for and a method of providing a display of mixed visible and sensor enhanced/sensed images. Further still, there is a need for a see-through display that provides a sensor overlay of mixed visible and sensor-enhanced/sensed objects. Further still, there is a need for a system for and a method of operating night vision equipment which allows the user to see more easily images that are viewable with the naked eye as well as images that are viewable using the sensor.

SUMMARY OF THE INVENTION

An exemplary embodiment relates to a method of controlling a see-through display. The method includes receiving a sensor signal. The sensor signal provides a representation of an image associated with a view of an outside scene. The method also includes receiving a video frame having pixels. Each of the pixels has a color and intensity. The method also includes changing the color or the intensity of selected pixels of the pixels in response to the sensor signal on a zonal or pixel basis.

Another embodiment relates to an apparatus for controlling display content on a see-through display. The apparatus includes a camera configured to provide image data associated with a scene associated with a see-through display. The image data includes image pixels. The apparatus also includes a processor coupled to receive the image data. The processor adjusts display pixels of display data or groups of the display pixels of the display data for contrast or color in response to corresponding image pixels or groups of the corresponding image pixels of the image data.

Another exemplary embodiment relates to a night vision, HUD or HMD system. The night vision, HUD or HMD system includes a CMOS sensor and a processor. The processor is configured to provide an adjusted pixel intensity or color for each of a plurality of pixels associated with a video input signal. The adjusted pixel intensity is provided in response to a sensor signal from the CMOS sensor. The processor provides the adjusted pixel intensity or color on a zonal or pixel basis.

BRIEF DESCRIPTION OF THE DRAWINGS

Exemplary embodiments are hereafter described, wherein like reference numerals denote like elements, and.

DETAILED DESCRIPTION OF THE PREFERRED EMBODIMENTS

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Figure 1:
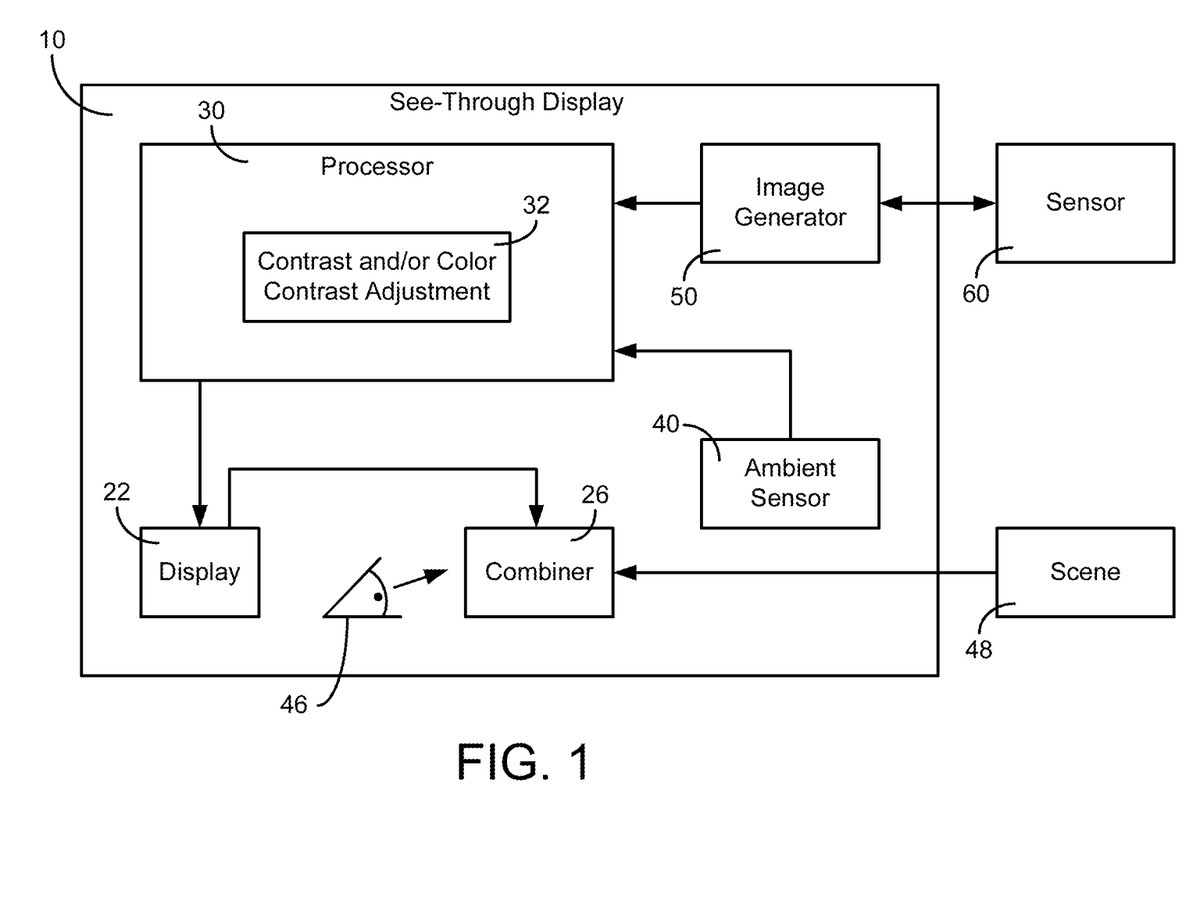
FIG. 1 is a general block diagram of a see-through display system for providing display content in accordance with an exemplary embodiment.

Referring to FIG. 1, an exemplary see-through display system 10 is depicted. See-through system 10 may be implemented in a wide variety of systems that require or desire color contrast and/or contrast control for display content. For example, system 10 may be a military targeting system, a night vision system, a medical imaging display system, a land based vehicle HUD or HMD system, an aircraft HUD or HMD system, etc. System 10 preferably includes a display 22 which may be any variety of pixilated displays, including, but not limited to liquid crystal displays (LCDs), emissive displays, etc. System 10 also includes electronics (e.g., a processor 30) and an ambient sensor 40. In certain embodiments, system 10 can include a combiner 26, an image generator, and a sensor 60.

System 10 can receive data from any number of different types of sensors. In an aircraft environment, system 10 can receive data from sources, including, but not limited to air data, inertial reference units, terrain data, navigation receiver data, etc. Image generator 50 can use the data from such sources to provide display symbology in one embodiment. Sensor 60 can be coupled to image generator 50. Alternatively, sensor 60 can be coupled to processor 30. Sensor 60 can be an image sensor, such as, a night vision sensor (e.g., image intensifier tube), a visible or non-visible light camera, an infrared sensor, etc. Sensor 60 can be part of an enhanced vision system.

Image generator 50 can be any device for providing data associated with display content for display 20. In one embodiment, image display generator 50 can include signal conditioning circuits, memory, video/graphics circuits, a HUD computer, a night vision display control circuit, or other device for providing frames of image data to processor 30. Image generator 50 can receive image frames from sensor 60 and provide an image frame including symbology and the image from sensor 60. Processor 30 can be part of a HUD computer, a night vision display control circuit, a display computer, a gaming console, or other display electronics.

In one embodiment, a user can see the image or display content on display 20 via a combiner 26 from a user's viewpoint 44. The user's viewpoint 44 also includes a view of scene 48 through combiner 26. Display 22 can include a projector or other optics for providing display content to combiner 26. Scene 48 can be an outside scene associated with an environment of sensor 60 or system 10.

System 10 can advantageously use processor 30 for providing contrast and/or color contrast adjustment via a contrast and/or color contrast adjustment module 32. As discussed throughout this application, processor 30 can provide any one of contrast adjustment, color contrast adjustment, or both contrast and color contrast adjustment without departing from the scope of the invention. In a preferred embodiment, processor 30 can be separate from or within image generator 50.

In a preferred embodiment, processor 30 receives an image or video frame associated with the image content provided on display 20. The video frame can represent symbology, graphics, text, video, or other image content associated with sensor 60 or other source. The image frame preferably includes pixels having color and intensity. The color can be a single color or multiple colors.

Processor 30 using module 32 operates to adjust intensity (e.g., luminance) or color of the pixels in the video frame in accordance with data received from ambient sensor 40 in one embodiment. In a preferred embodiment, ambient sensor 40 provides an image or video frame including pixels associated with a scene 48 (e.g., an outside scene) of display system 10.

The data in the image frame from ambient sensor 40 is preferably representative of the ambient light in scene 48. Processor 32 processes the data from ambient sensor 40 to determine if pixels associated with the image frame from image generator 50 need to be adjusted. Pixels can be adjusted in intensity (e.g., luminance or brightness) or color. For example, if a symbol in the image frame from generator 50 is provided in the same color as detected by sensor 40 in scene 48, processor 30 can adjust the color to a different color to achieve superior color contrast. Similarly, if scene 48 is bright in a particular area, the pixels associated with that area of the frame from image generator 50 can be increased in intensity to provide appropriate contrast. Yet further, if color balance associated with image content is affected by color or brightness from ambient illumination, processor 30 can adjust brightness or color.

According to an alternative embodiment, processor 32 can make adjustments based upon a zonal basis rather than on a pixel-by-pixel basis. In such an operation, sensor 40 can sense color and brightness associated with particular zones of the display content. The zones can be of various sizes. A four zone embodiment includes upper left, upper right, lower left and lower right quadrants. Eight zones, sixteen zones, thirtytwo zone, sixty-four zone embodiments are also possible. The use of zones saves processing time for determining adjustments to color and/or intensity.

In one embodiment, ambient sensor 40 is a forward looking visible light sensor that can measure the light associated with scene 48. In one embodiment, sensor 40 provides a pixel display image having sixteen luminance bit levels for each of three colors. Preferably, sensor 40 is a CMOS camera. The CMOS camera preferably is disposed to look forward to scene 48. Sensor 40 can be a color sensor or monocolor sensor depending upon application criteria.

In one embodiment, the camera preferably has the same focal length and field of view as sensor 60 or as the image provided on combiner 26, thereby providing a one-to-one mapping of the field of view of display 22 and sensor 40. Generally, in HUD applications and HMD applications, sensor 40 can have a focus set to infinity and can be disposed next to combiner 26 to have the same field of view of scene 48. In a preferred embodiment, pixels of sensor 48 can be mapped to pixels of the image on display 22.

Pixels of sensor 40 represent brightness across two dimensions of outside scene 48. In addition, if sensor 40 is a color light sensor, pixels can represent luminance or brightness for each of three colors. Generally, the pixels of the display image can be adjusted to maintain a contrast ratio between 1 and 1.2 verses the background in a preferred embodiment.

Contrast and/or color contrast adjustment module 32 preferably executes a transfer function on the image data. The transfer function individually or zonally adjusts pixel brightness (e.g., darker or brighter) or color based upon a corresponding pixel or zone from sensor 40. Color contrast adjustments can involve an adjustment of both luminance and color. Color symbology can be particularly problematic without adjustment because colors can look different depending on the ambient colors. For example, a white color is difficult to use on a see-through display without adjustment because background colors add to the colors on display 22. Further, if the luminance of different colors are not balanced against background colors, the symbols tend to blend into the background.

In one embodiment, sensor 40 has an auto gain function that can control the output of sensor 40. Sensor 40 can also adjust the image capture time (e.g., the integration of incoming light). Processor 40 preferably calibrates the data from sensor 40 and with the data from sensor 60 using the auto gain function and image capture time. In this way, the image content is accurately compared to light levels associated with scene 48 in one embodiment. In applications such as HUD and HMD applications, the scene 48 generally is not changing rapidly and sensor 40 can have different gain and capture times on sequential frames to increase the dynamic range of sensor 40.

Once the dynamic range of sensor 40 has been controlled properly, an analysis can be carried out on the image data by processor 30. The image captured by sensor 40 can be used to measure the see-through light across the entire image in one embodiment. The measure of see-through light across the entire image allows an appropriate level of display adjustment to be made across the entire image in one embodiment, preferably in real or near real time. Contrast and/or color contrast adjustment module 32 can adjust color contrast of the image frame of display 22 at full frame level, whereby the relative colors of (e.g., red, green and blue levels) of the image from sensor 40 provide a global color level for each color of the image provided by display 22. For example, if portions of the sky are detected as being red, than the corresponding portions of the display image on display 22 can be enhanced to increase the color contrast of red. (e.g., the red components of corresponding portion of the display 22 can be enhanced to increase the color contrast of red).

The dynamic range of each pixel may be limited by the control electronics in certain display technologies (e.g., in certain emissive displays). Certain display technologies have one level of luminance for the entire display and each pixel has some level of pixel level control (e.g., 8-bit or 10-bit pixel control). Such a system may use localized backlight controls (LED backlights) to locally control zones of display 22 to be made brighter or darker in accordance with adjustments from module 32.

In certain embodiments, system 10 may be employed with mechanisms to reduce brightness from the sun. In general, conventional displays are not able to match the sun's luminance without reducing the transmission of combiner 26. Accordingly, system 10 can be provided with mechanisms such as photochromatic coatings, electrochromatic coatings, sun shades, etc. to reduce brightness from the sun. The utilization of such mechanisms is preferably detected by system 10 so appropriate modifications of the calibration curve can be made. This can be achieved by placing the mechanisms in front of sensor 40 as well as in front of combiner 36. Alternatively, a control signal to processor 30 can be provided when such mechanisms are engaged. Alternatively, the control signal can be provided to sensor 40 for adjustment at sensor 40.

The use of system 10 with contrast and color contrast adjustment 32 advantageously allows colors not conventionally used in a HUD to be used. For example, blue colors can be used which are generally not available in HUD applications because blue symbols are difficult to see on a blue sky without the use of module 32. Similarly, orange and red symbols can be adjusted to be viewed when a setting sun provides orange or red colors in the atmosphere so they can be viewed on combiner 26. Adjustments can be particularly beneficial in HUD applications when an aircraft is landing and Earth colors come into view.

Figure 2:
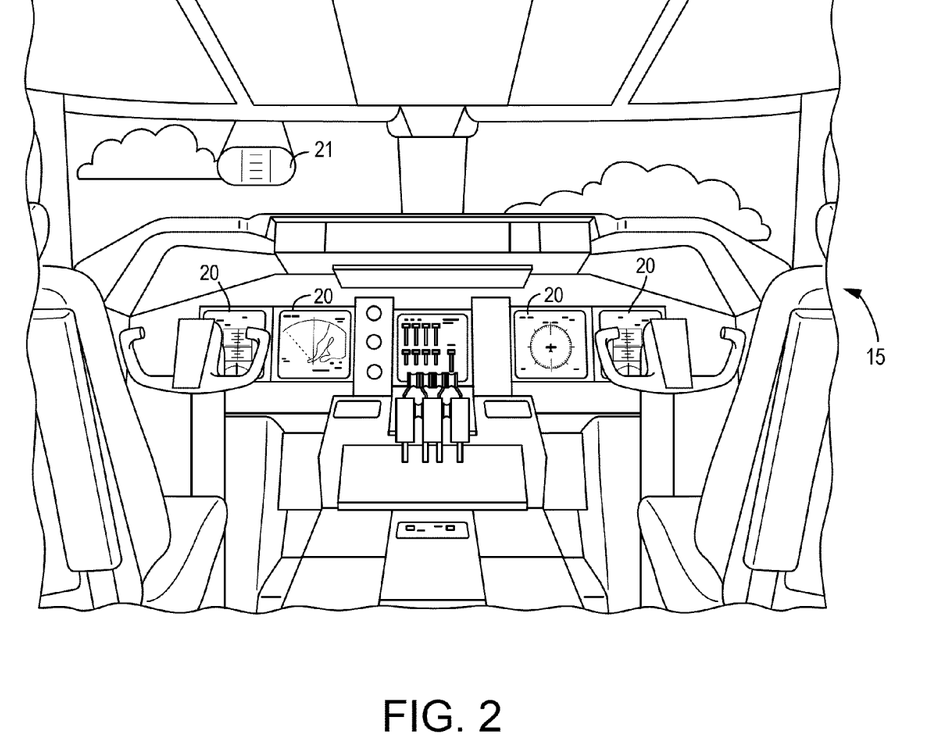
FIG. 2 is a perspective view illustration of a control center or cockpit for an aircraft including a see-through display system, according to another exemplary embodiment.

Referring to FIG. 2, an illustration of a control center or cockpit 15 for an aircraft is shown, according to one exemplary embodiment. Aircraft control center 15 includes flight displays 20. Flight displays 20 can be used to provide information to the flight crew, thereby increasing visual range and enhancing decision-making abilities.

In one exemplary embodiment, flight displays 20 includes a head up display (HUD) including a combiner 21 or worn displays (helmet mounted displays (HMDs) with or without a projector. The HUD is generally configured to display at least one of graphical and textual images or indicia. The images or indicia are displayed onto an otherwise generally transparent medium or combiner 21 that the flight crew can see-through. The images can include synthetic vision images and enhanced vision images. For example, combiner 21 may display navigational or guidance data overlayed onto a runway that the flight crew is viewing. The images may also be overlayed onto a view of terrain, other aircraft, cloud cover, low visibility conditions, other hazards, etc.

Figure 3:
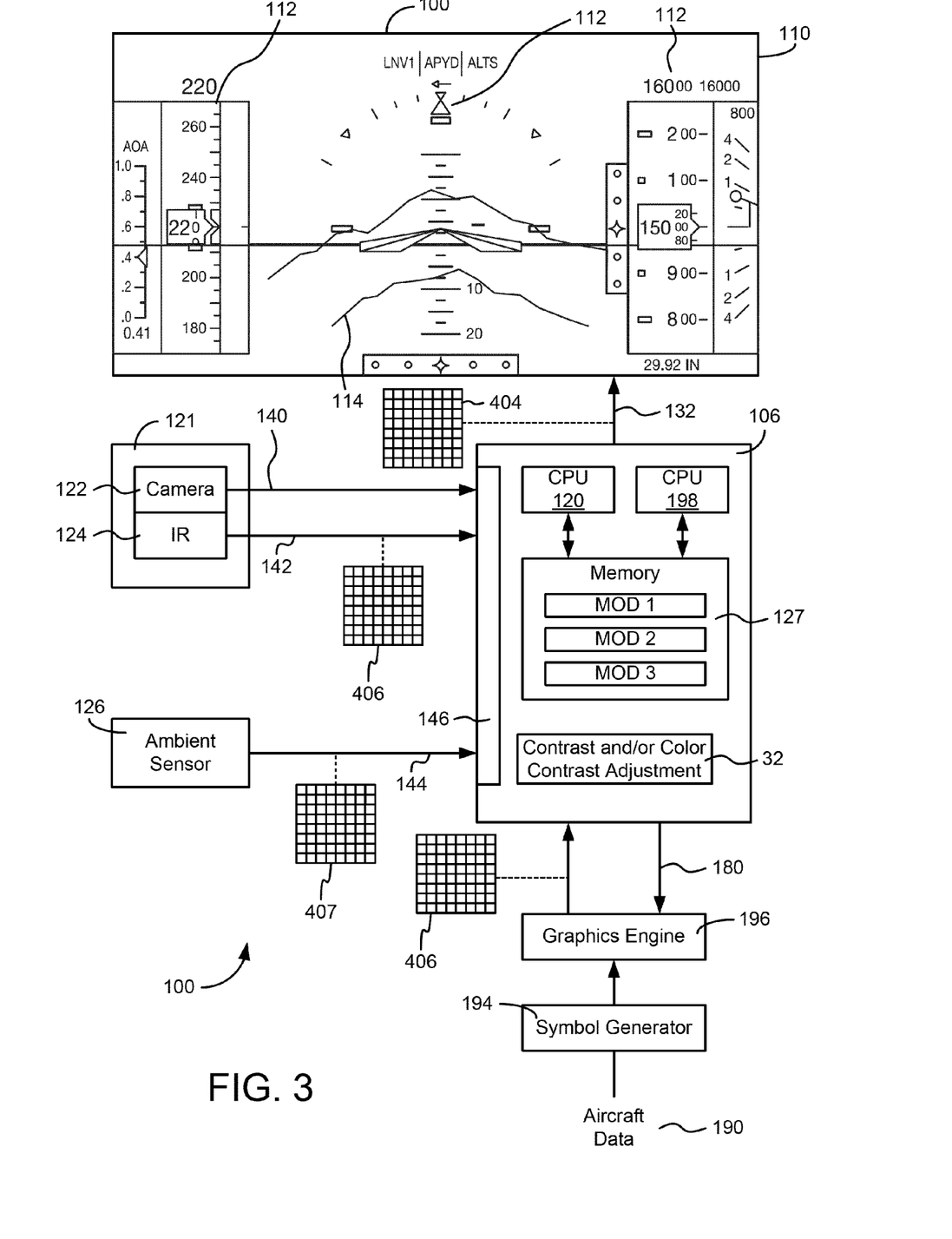
FIG. 3 is a general schematic block diagram of the see-through display system for the aircraft illustrated in FIG. 2, according to an exemplary embodiment.

With reference to FIG. 3, a see-through display system embodied as an aircraft HUD system 100 is depicted. System 100 may be implemented in a wide variety of systems that accept input control signals to control display content on a display 110. For example, system 100 may be implemented in systems including but not limited to medical imaging display systems, land based vehicle HUD or aircraft HUD. Accordingly, display 110 may be any variety of pixilated displays, including, but not limited to a liquid crystal display (LCD).

System 100 can receive data 190 from a number of sources including, but not limited to sensors, inertial reference units, air data, terrain data, navigation receiver data, etc. For example, in FIG. 3, a sensor input 121 can contain several sensor modules including but not limited to a video camera module, an infrared imaging sensor module, a millimeter wave radar sensor, or other sensor. In one exemplary embodiment, sensor input 121 can be mounted on the exterior of an aircraft 110 to detect conditions such as terrain, weather conditions, the presence of other aircraft, altitude, speed or a runway path, for example.

Computer 106 can utilize data such as image frames or video frames 406 from graphics engine 196 and image frames or video frames 406 from sensors 122 and 124 to provide and image frame or video frame 404 for display on display 110. Processors 120 and 198 can cooperate to ultimately build image frame 404 using contrast and/or color contrast adjustment module 32 for display 110. The image or video frame 404 frame can include symbols provided by symbol generator 194 and graphics from graphics engine 196 provided in response to aircraft data 190 as well as camera and sensor images from sensor input 121 and synthetic vision images from a synthetic vision system.

Advantageously, system 100 also includes an ambient sensor 126 similar to ambient sensor 40 described with reference to FIG. 1. Ambient sensor 126 can provide data (e.g., a video or image frame 407) via input 144 coupled to interface 146 of display computer 106. Image frames 407 from sensor 126 can be stored in memory 127. Advantageously, computer 106 can execute contrast and/or color contrast adjustment module 32 in accordance with image frame 407 associated with sensor 126 to adjust the image frames 406 provided by engine 196 by sensor input 121 or a merged frame thereof.

Display computer 106 includes a processor 120 and memory 127 that may include any number of memory modules, for example mod 1-mod 3, which may correspond to the sensors 122 and 124 and sensor 126 associated with sensor input 121 or may store data associated with various processes needed for controlling display system 100. Display computer 106 can accept multiple sensor inputs 140, 142 and 144. Inputs 140 and 142 provide information to be used as display content for display 110. Display 110 may include a projector, tuned optics, and a combiner for providing an image to a user. Sensors 122, 124 and 126 can be mounted in a fixed position and orientation on an aircraft. Each sensor 122, 124 and 126 may include a sensor computer for providing a special processing region within the imaging sensor field of view. Alternatively, the special processing may be carried out on display computer 106 or other processing devices. Infrared imaging sensor 124 provides an infrared image to HUD computer 106 via video interface 142 at interface 146. Further, display computer 106 can communicate over communication links 140 and 142 to sensor input 121 and over link 144 to sensor 126 for the purpose of providing command information to sensors 122, 124 and 126.

Once the pixels in an input video frame 406 have been altered according to contrast and/or color contrast module 32 on a pixel by pixel basis at display computer 160, the output video signal 132 corresponding to output video from 404 may be sent to display system 100 to be viewed by a user in one preferred embodiment. Furthermore, output video signal may be preprocessed prior to display system 100 for signal conditioning, or other preprocessing that may be required at display computer 106. In addition, video output signal 132 may be by merged with independently generated symbology content generated at graphics engine 196 so that the final display content on display system 100 includes both output video content 114 and symbology content 112. For example, referring to FIG. 3, symbology content 112 which may include altitude, flight speed, navigation information or other aircraft data 190 can be superimposed over the video output content 114 which may include video captured from an infrared or other camera mounted on the exterior of the aircraft. In FIG. 3, the video output content 114 includes a video frame depicting mountainous terrain detected from sensor 122 (e.g., a camera) at sensor input 102.

Symbology content 112 is generated in response to aircraft data 190. In accordance with alternative embodiments, aircraft data 190 may include but is not limited to any variety of sensor signals including the position of aerodynamic control surfaces, environmental variables affecting the flight of the aircraft, and/or the operating conditions and status of the pilot's controls. Analog data are converted into digital signals by analog-to-digital converters either included in or outside of symbol generator 194. When receiving aircraft data, symbol generator 194 creates a display list containing drawing instructions for the graphics engine 196. Symbol generator 194 places instructions in a display list to locate the symbol in the correct X and Y position of display system 100. Once the location and type of symbol to be drawn on the pixilated display have been determined, the resultant symbology can be sent to display computer 106 to be merged with the altered video input signal to create video output signal 132 as display content on display 110.

Because the content of symbology and video content are independently generated, two different processes govern the degree of pixel intensity chosen for each component. Symbology pixel intensity is conventionally drawn at graphics engine 196 at maximum intensity for all symbology pixels drawn at maximum pixel intensity or maximum apparent pixel intensity before adjustment by contrast and/or color contrast adjustment module 32.

Figure 4:
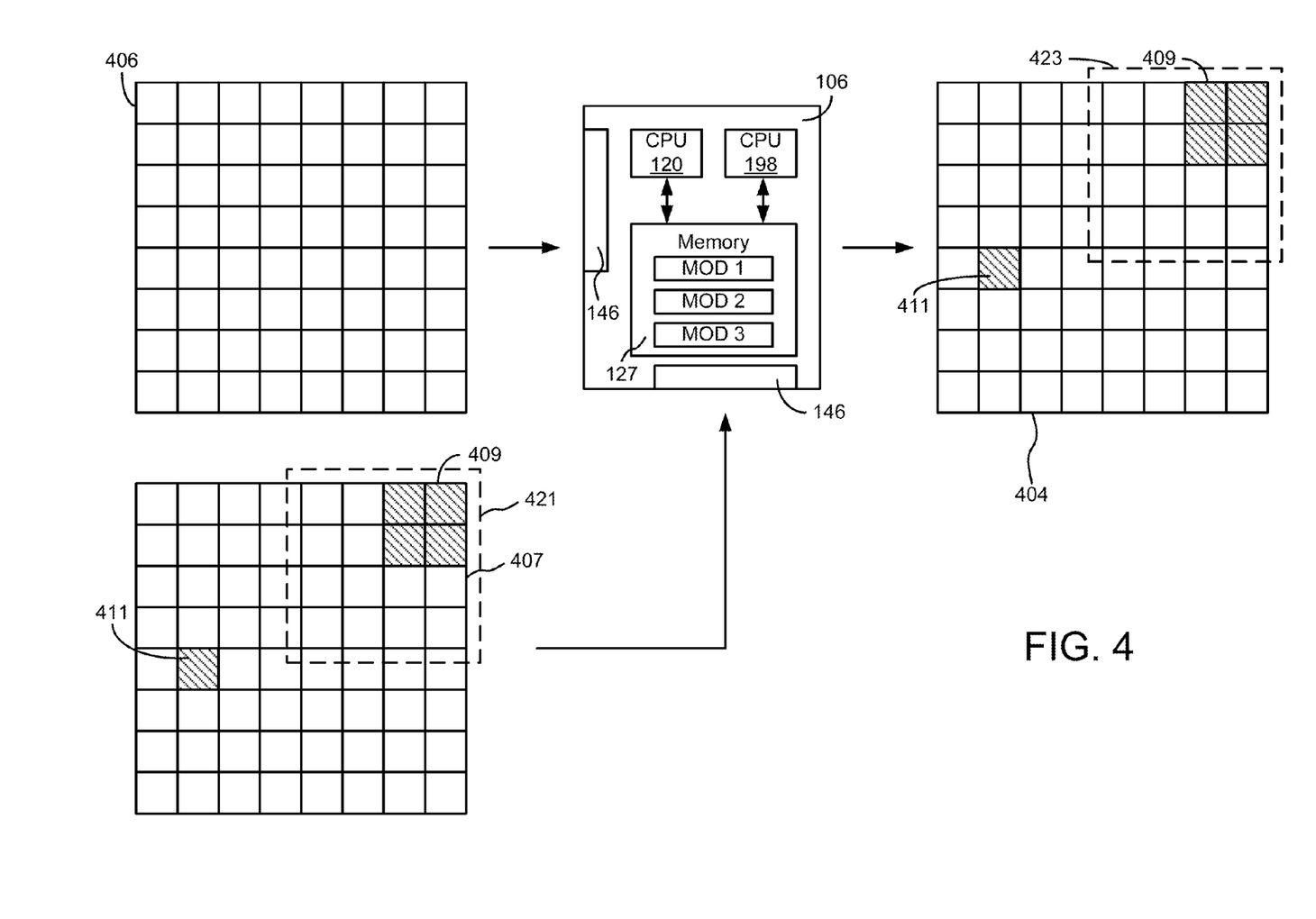
FIG. 4 is a schematic illustration of color contrast and/or contrast control for the system illustrated in FIG. 3 according to one exemplary embodiment.

With reference to FIG. 4, a video or image frame 404 associated with a video signal for display 110 is processed in computer 106. Computer 106 also receives an image or video frame 407 associated with data provided by sensor 126 and a video or image frame 406 provided by engine 196, generator 194 and/or input 121. Frame 407 includes pixels 409 and 411 that may be particularly bright or a particular color. Computer 106 compares pixels of video frame 406 on a pixel-by-pixel basis with pixels of video frame 407 in one embodiment. If the pixels indicate that a contrast or color contrast issue occurs, an adjustment can be made so that an output frame 404 has adjusted pixels. In one embodiment, pixels 409 and 411 can be adjusted by computer 406 in frame 404 due to brightness in those areas associated with the outside scene or matching colors associated with frames 406 and 407.

Alternatively, an entire zone can be chosen for adjustment. For example, a zone 421 including pixels 409 can be chosen for adjustment rather than the more computationally intensive pixel-by-pixel comparison. Zone 421 corresponds to a zone 423 in frame 404. Alternatively, larger zones may be chosen (e.g., top half of image, middle 25 percent of image, etc.).

Figure 5:
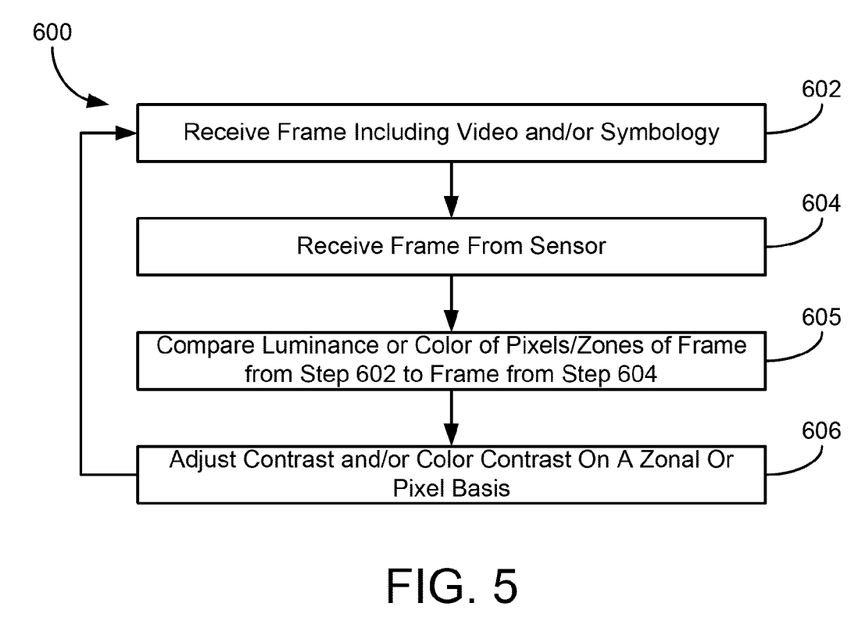
FIG. 5 is a flow chart of color contrast and/or contrast control for the system illustrated in FIG. 3 according to one exemplary embodiment.

With reference to FIG. 5, a process 600 for HUD computer 106, includes, a step 602 at set up 106, HUD computer 106 receives data necessary for providing frame 404 including video and/or symbology. At a step 604, computer 106 receives frame 409 from ambient sensor 126. At a step 605, computer 404 executes contrast and/or color contrast module 32 to compare frame 404 to frame 407 on a pixel basis or a zonal basis. At a step 606, computer 404 executes contrast and/or color contrast module 32 to adjust contrast and/or color contrast on a zonal or pixel basis.

Although module 32 is shown as part of computer 106, module 32 can be located in various parts of a HUD system without departing from the scope of the invention. Module 32 can be stored as software instructions on a non-transitory medium.

Figure 6:
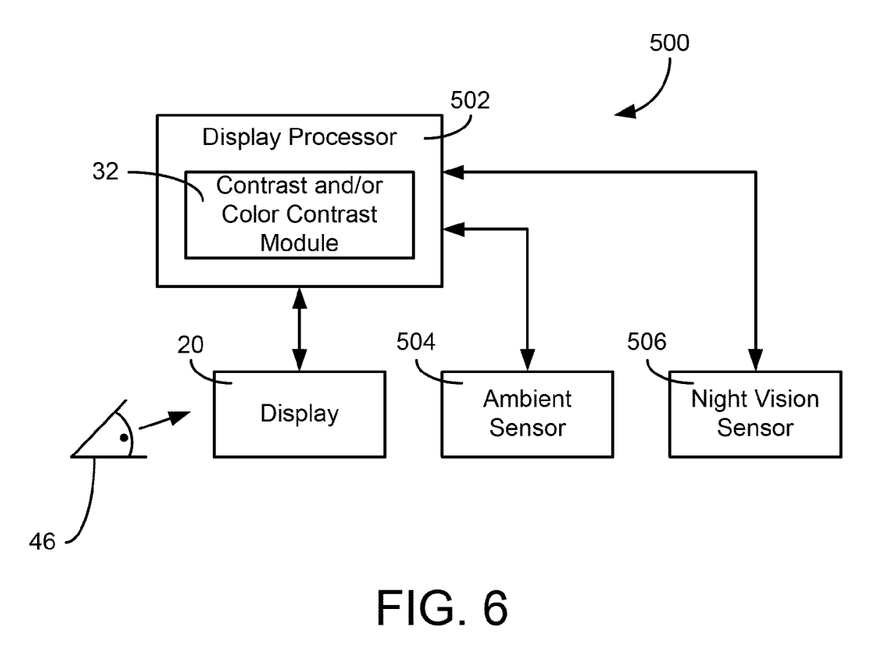
FIG. 6 is a general block diagram of a see-through display system, according to another exemplary embodiment.

With reference to FIG. 6, a see-through display system is embodied as a night vision system 500. Night vision system 500 includes a night vision sensor 506, display electronics or a processor 502, contrast and/or color contrast module 32, ambient sensor 504 and display 20.

Night vision system 500 can be embodied as a straight through goggle system where photo-imaging is in-line with sensor 506 (e.g., an imaging intensifier tube) and the output is collimated by an eye piece. Alternatively, system 500 can also be a system similar to Cats Eyes, Viper 3, Top Owl Systems, or a non-inline system and configured as described herein.

Sensor 504 is preferably similar to sensor 40 discussed with reference to FIG. 1. Sensor 504 is preferably disposed with respect to sensor 506 to reduce parallax. Sensor 504 can be disposed between sensor 506 and the user's eye 46. Sensor 504 can be disposed just before a combiner. Display electronics 502 preferably executes module 32 to advantageously implement a night vision system capable of working in mixed environments.

Figure 7:
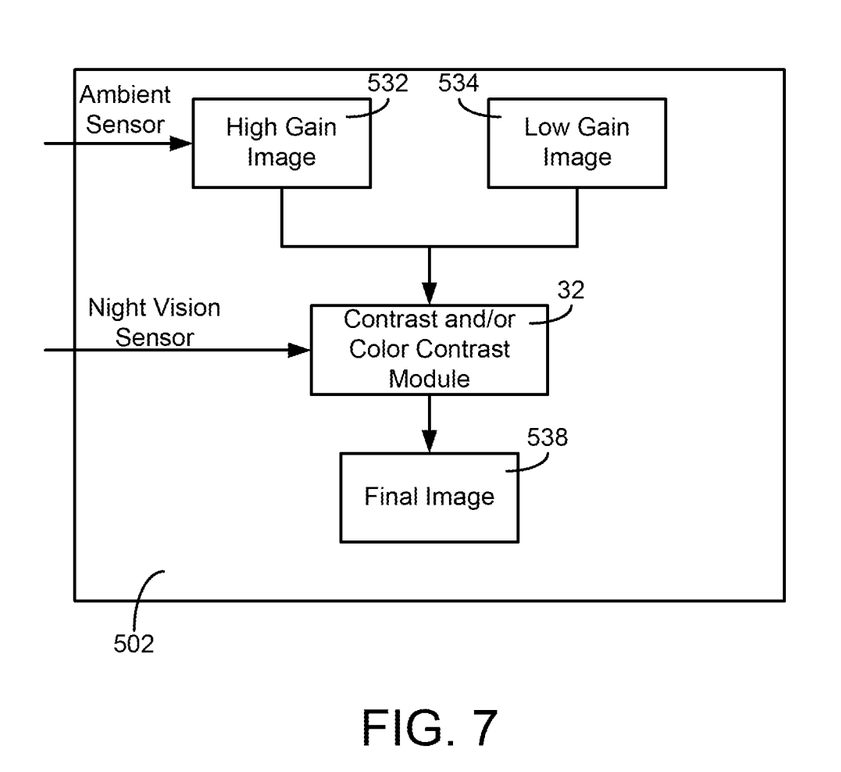
FIG. 7 is a schematic illustration of color contrast and/or contrast control for the see-through display system illustrated in FIG. 6 in accordance with an exemplary embodiment.

With reference to FIG. 7, in one embodiment, processor 502 receives image data, such as a video frame or image data from night vision sensor 502 and receives an image frame from sensor 504. Module 32 uses the data or the image frame from ambient sensor 504 to define areas of a final image which are taken from the image frame from sensor 520. In this way, sections not taken from sensor 520 are removed from display by night vision sensor system 500 and allowed to be viewed via the naked eye. Images can be removed by adjusting or changing the image intensity (e.g., luminance) to zero or near zero for portions of the image which can be viewed by the naked eye in one embodiment. In such an embodiment, the data from sensor 502 can be analyzed to see if it reaches a threshold which is viewable by the naked eye. The determination can be made in response to color and/or luminance levels.

Figure 8:
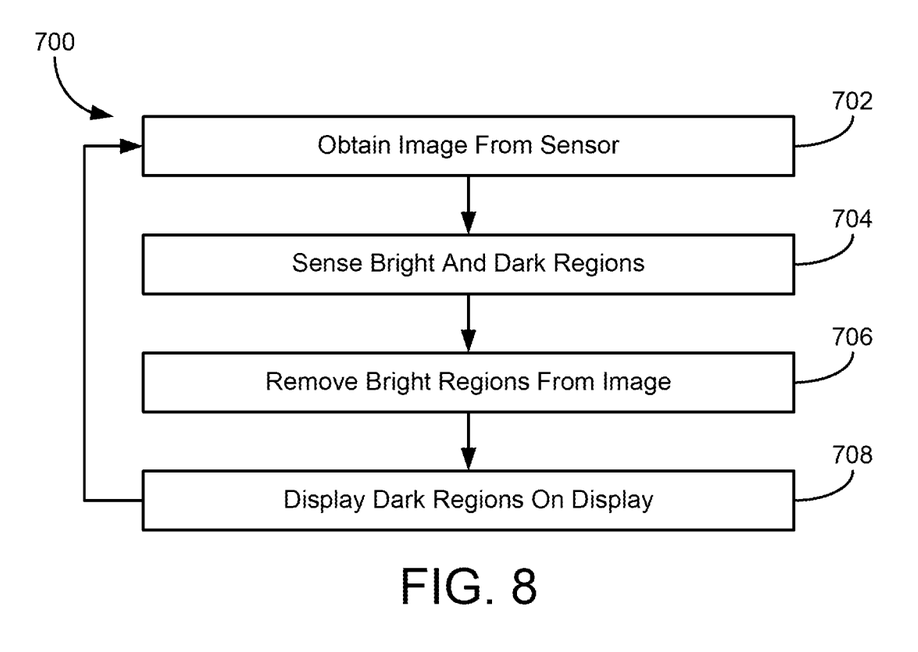
FIG. 8 is a flow chart of color and/or contrast control for the system illustrated in FIG. 6, in accordance with an exemplary embodiment.

With reference to FIGS. 7 and 8, ambient sensor 504 provides a high gain image 532 and a low gain image 534 in one embodiment in a step 702. Alternatively, a single image can be provided in step 702.

Module 32 uses the high gain image 532 and a low gain image 534 to determine bright and dark regions using module 32 in a step 704. At a step 706, bright regions are removed from the image frame from sensor 506. At step 708, a final image 538 is provided which includes images in dark regions from sensor 506. Therefore, module 32 implements a mask for removing portions of the image from sensor 506 so that the image from sensor 506 includes only regions that are not viewable by the naked eye in one embodiment.

Figure 9:
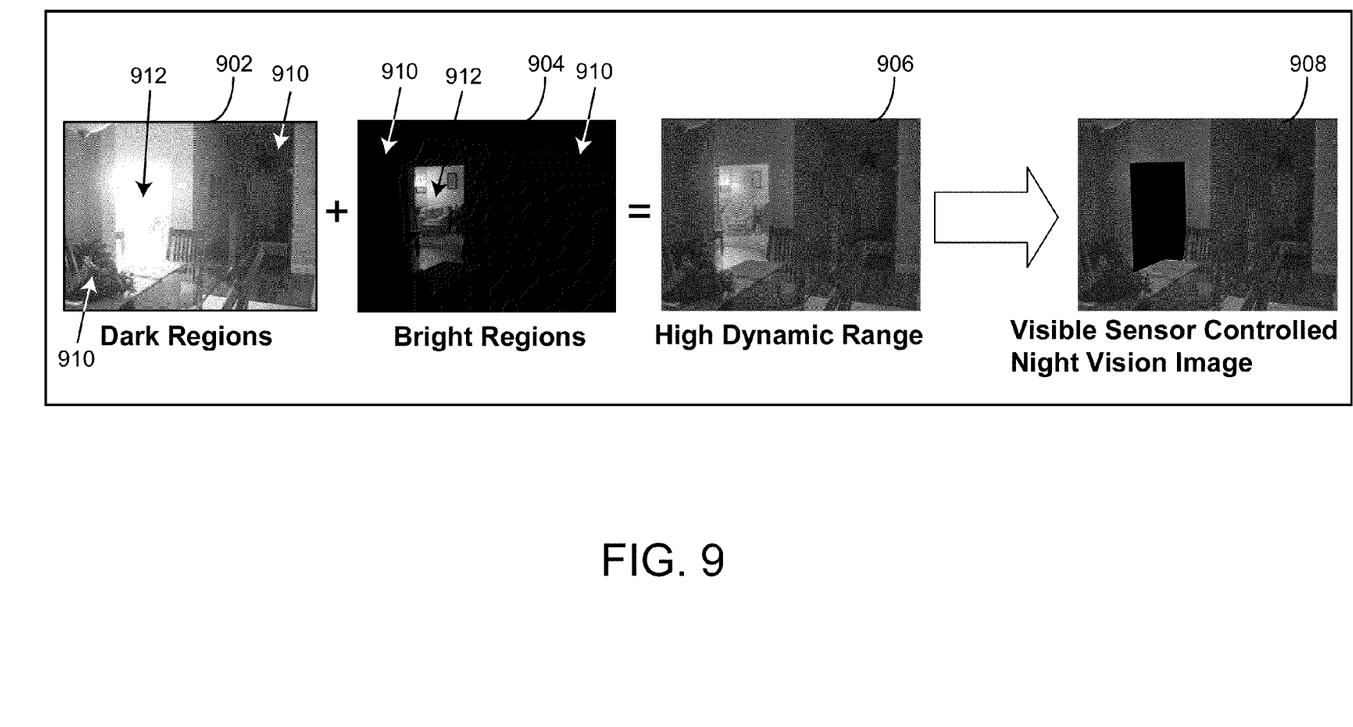
FIG. 9 is an illustration of images associated with the system illustrated in FIG. 6 according to another exemplary embodiment.

With reference to FIG. 9, a mixed ambient environment is shown. Dark regions 910 sensed by ambient sensor 504 are shown in frames 902 and 904 and a bright region 912 sensed by ambient sensor 504 is shown in frames 902 and 904. Dark regions 910 can be sensed using a high gain setting or long integration time associated with image 902, and bright region 912 can be sensed by low gain setting or short integration time associated with image 904. The combination of images 902 and 904 form a high dynamic range image 906 which exemplifies a more ideal view through see-through display system 500. Module 32 uses images 502 and 504 to form a mask in which bright region 912 can be viewed with the naked eye and dark regions 910 are viewed from sensor 506.

Advantageously, system 500 allows illuminated zones to be scene by the naked eye so that there is no need to adjust night vision sensor 506 to see what can already be seen by the naked eye. Integration time and gain adjustments are not necessary to see bright regions 910 due to the use of contrast and/or control contrast adjustment module 32. By using sensor 504, zones that can already be seen by the naked eye can be negated from the integration time/gain control algorithms associated with sensor 506 allowing sensor 506 to be adjusted to the darker zones. Accordingly, an image of overexposed zones associated with bright region 912 can be avoided. As provided by system 500, the mixed environment can appear as image 906 as the naked eye views bright regions 912 without interference from sensor 506.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of controlling a see-through display, the method comprising:
   receiving a sensor signal, the sensor signal providing a representation of an image associated with a view of an outside scene;
   receiving a video frame having pixels, each of the pixels having a color and intensity; and
   changing the intensity of selected pixels of the pixels in response to the sensor signal on zonal or a pixel basis, wherein the intensity is changed according to a mask, the mask defining an area of the display where an image from a night vision sensor is removed.

2. The method of claim 1, further comprising:
   displaying an image associated with the video frame on a combiner, wherein the image from the night vision sensor is removed from the video frame according to the mask.

3. The method of claim 2, wherein the intensity is changed on a zonal basis, the zonal basis using at least four zones.

4. The method of claim 1, wherein the display is in a head up display (HUD) system and the sensor signal is received from a visible light camera.

5. The method of claim 1, wherein the display is a night vision system display.

6. The method of claim 5, wherein the sensor signals are from a Complementary Metal Oxide Semiconductor (CMOS) sensor camera disposed between a combiner and the night vision sensor.

7. The method of claim 1, wherein color is changed.

8. The method of claim 7, wherein the color is changed on a zonal basis.

9. The method of claim 1, wherein a portion of the image from the night vision display is displayed on a combiner.

10. The method of claim 1, wherein a processor adjusts the intensity by removing image data associated with a bright region in a field of view of the night vision sensor.

11. An apparatus for controlling display content on a see-through display, the apparatus comprising:
- a camera configured to provide image data associated with a scene associated with the see-through display; and
- a processor coupled to receive the image data, the processor adjusting display pixels of display data or groups of the display pixels of the display data for contrast or color in response to corresponding image pixels or groups of the corresponding image pixels of the image data, wherein the processor adjusts the display data by removing the image data associated with a bright region in a field of view of a night vision sensor.

12. The apparatus of claim 11, wherein the contrast or color is changed according to a mask, the mask defining an area of the display where an image from the night vision sensor is removed.

13. The apparatus of claim 11, wherein the camera is a Complementary Metal Oxide Semiconductor (CMOS) sensor.

14. The apparatus of claim 13, wherein the display content includes an image from an infrared sensor.

15. The apparatus of claim 11, wherein the see-through display includes a liquid crystal display.

16. The apparatus of claim 11, wherein the display content includes video content merged with symbology.

17. The apparatus of claim 11, wherein the camera is disposed between a combiner and a projector or adjacent the combiner.

18. A night vision head up display (HUD) or helmet mounted display (HMD) system, comprising:
- a Complementary Metal Oxide Semiconductor (CMOS) night vision sensor; and
- a processor configured to provide an adjusted pixel intensity or color for each of a plurality of pixels associated with a video input signal, the adjusted pixel intensity or color being provided in response to a sensor signal from the CMOS night vision sensor, the processor providing the adjusted pixel intensity or color on a zonal or pixel basis, wherein the processor provides the adjusted pixel intensity or color by removing image data associated with a bright region in a field of view of the night vision sensor.

19. The night vision head up display (HUD) or helmet mounted display (HMD) system of claim 18, wherein the processor is part of display electronics for the head up display (HUD) or helmet mounted display (HMD).

20. The night vision head up display (HUD) or helmet mounted display (HMD) system of claim 18, wherein the video input signal is from a night vision sensor.

* * * * *